United States Patent [19]

Martin et al.

[11] Patent Number: 5,355,302

[45] Date of Patent: Oct. 11, 1994

[54] SYSTEM FOR MANAGING A PLURALITY OF COMPUTER JUKEBOXES

[75] Inventors: John R. Martin; Michael L. Tillery; Samuel N. Zammuto, all of Rockford, Ill.

[73] Assignee: Arachnid, Inc., Rockford, Ill.

[21] Appl. No.: 846,707

[22] Filed: Mar. 6, 1992

Related U.S. Application Data

[63] Continuation-in-part of Ser. No. 538,981, Jun. 15, 1990, abandoned.

[51] Int. Cl.⁵ .............................................. G06F 15/44
[52] U.S. Cl. .................................................... 364/410
[58] Field of Search ................. 364/479, 410; 395/600

[56]  References Cited

U.S. PATENT DOCUMENTS 4,232,295 11/1980 McConnell ................... 340/152 R
4,412,292 10/1983 Sedam et al. .................... 364/479
4,633,445 12/1986 Sprague .
4,667,802  5/1987 Verduin et al. .................. 194/217
4,956,768  9/1990 Sidi et al. ......................... 395/425
5,058,089 10/1991 Yoshimaru et al. ............... 369/32

Primary Examiner—Gail O. Hayes
Attorney, Agent, or Firm—McAndrews, Held & Malloy

[57]  ABSTRACT

A method and apparatus is shown for managing a plurality of computer jukeboxes at different locations from a central station. Each jukebox includes processor means for controlling the computer jukebox, storage and retrieval means for data, display means for selection menus, audio production means for playing musical records, and a user interface enabling patrons to communicate with the processor means. The central station can be used to download musical recording data to each computer jukebox, and each computer jukebox can upload usage data to the central station.

12 Claims, 5 Drawing Sheets

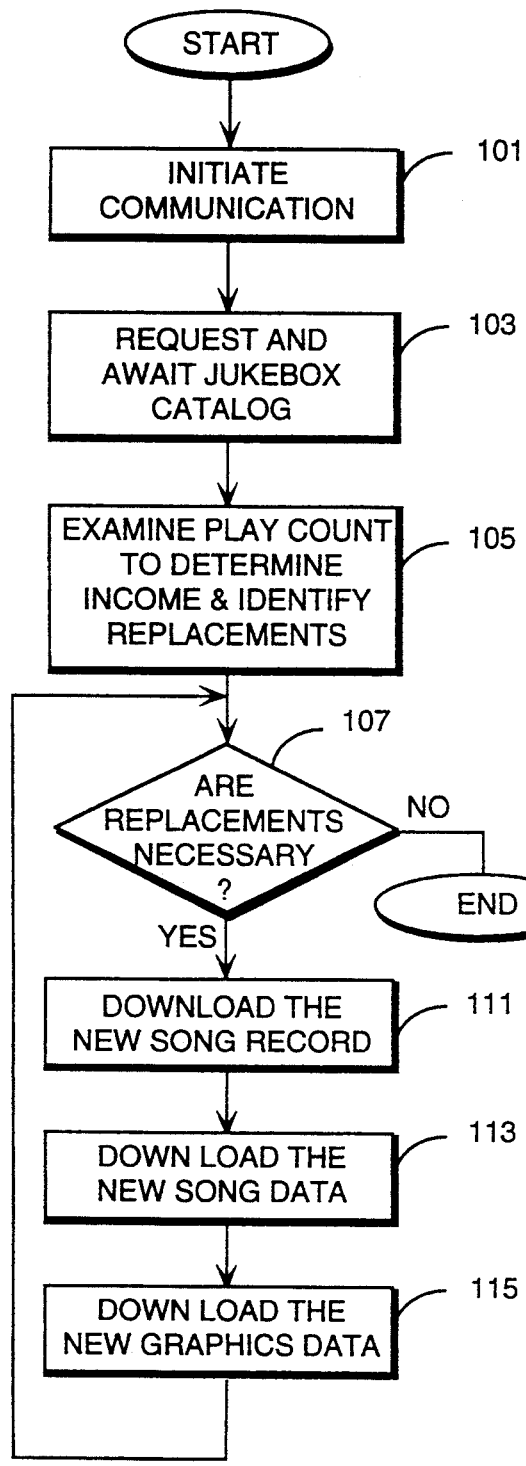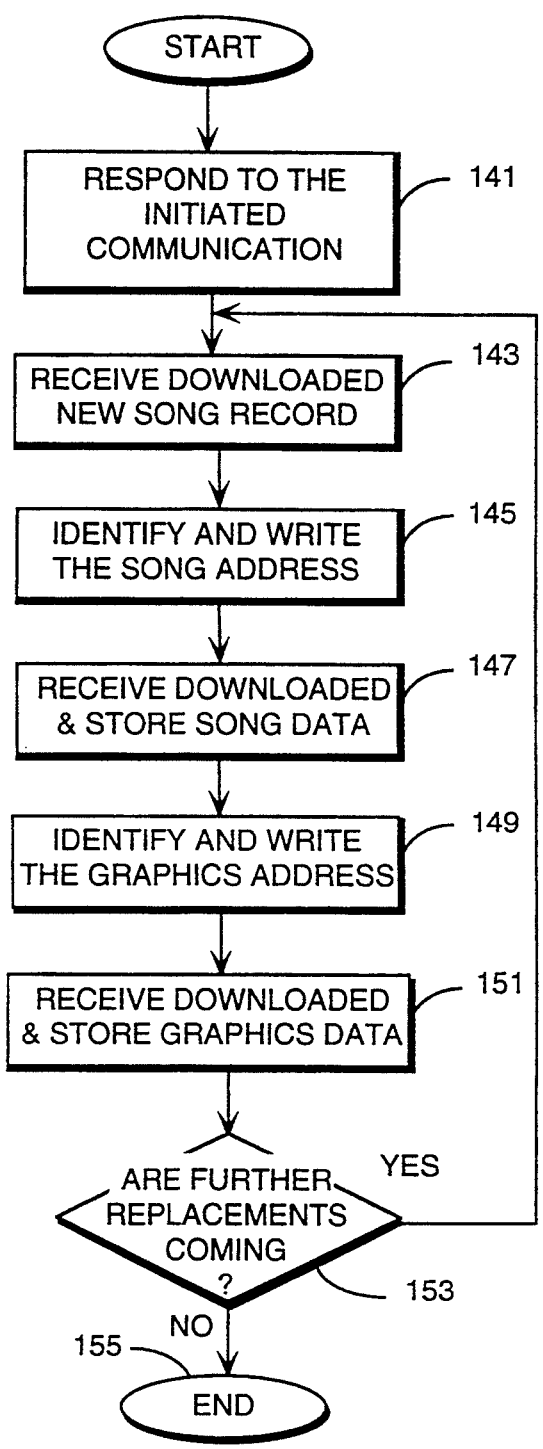

SYSTEM FOR MANAGING A PLURALITY OF COMPUTER JUKEBOXES

This is a continuation-in-part of U.S. patent application Ser. No. 07/538,981, filed Jun. 15, 1990 now abandoned.

FIELD OF THE INVENTION

The present invention relates generally to a jukebox system, and more particularly to such a system including one or more computer jukeboxes that can be managed from a remote location.

BACKGROUND OF THE INVENTION

Heretofore, an assortment of musical recordings found in a jukebox consists of a plurality of records, each record containing a specific recording. Traditionally, these records are grooved phonograph records. After a patron makes a selection, the selected phonograph record is mechanically removed from a storage rack within the jukebox, and the phonograph record is placed upon rotating platform. A stylus which is connected to a speaker system is then placed upon the rotating phonograph record, resulting in the phonograph record being played by the jukebox. For each selection, a separate phonograph record must be removed from the storage rack in order to be played by the jukebox.

Conventional jukeboxes have also implemented compact disks as means for creating an assortment of musical songs. Compact disks provide the improved sound quality made possible by digital recordings. The same technique, however, is used to play compact disks. A separate compact disk corresponding to each selection must be removed from a storage rack in order for the jukebox to play the selection.

Updating conventional jukeboxes is a costly and time consuming task. Routemen must periodically travel to each jukebox location and replace the existing recordings of each jukebox with up-to-date records. The existing recordings are no longer used by the jukebox once removed, thus making the conventional method wasteful.

Routemen must also travel to each jukebox location to keep a tally of the number of times each musical recording is selected in order to determine royalty fees. It is known to provide a jukebox with a counter that keeps track of the number of times each musical recording is selected, but routemen must still travel to each jukebox location to obtain this information. Such a process requires an excessive number of people to visit jukebox location periodically and visually read the information off the counter within each jukebox. Since the number of jukeboxes in operation is quite large, the employment of routemen to obtain such data involves a considerable expense. Furthermore, the ever changing nature of the recording industry requires that such data be gathered frequently in order to keep abreast of a continually changing market.

OBJECTS AND SUMMARY OF THE INVENTION

Accordingly, it is a primary object of the present invention to provide a method and apparatus for managing a plurality of computer jukeboxes which is capable of eliminating the necessity for routemen to change records in the jukeboxes. The computer jukeboxes store recordings in memory, thus enabling routemen to simply load new recordings into the memory of each computer jukebox.

Another object of the present invention is to eliminate a necessity for routemen by enabling new recordings and selection menus to be downloaded to each computer jukebox via a transmission link. In that regard, it is an object of the present invention to provide a method and apparatus which eliminates the material waste usually associated with updating jukeboxes. Instead of throwing away old recordings and replacing them with new ones, as is the conventional procedure, the present invention eliminates this waste by enabling new recordings to simply be downloaded into the memory of each computer jukebox. The old recordings are simply erased, if necessary.

Another object of the present invention is to provide a method and apparatus which is capable of remotely obtaining jukebox usage data, thus eliminating a necessity for routemen to do this task. The present invention utilizes a computer jukebox, which as part of its software programming, stores the number of times each musical recording is played and the number of credits that have been awarded. This data is uploaded to a central control device via a transmission link.

An additional object of the present invention is to provide a method and apparatus utilizing modern computer technology to digitally store and play musical records. The jukebox of the present invention is basically a computer having a sophisticated audio production capability, the computer storing digitized song data in a computer memory. Because conventional jukeboxes maintain compact discs or records in the jukebox, theft of the compact disc/records has been a problem, this problem being eliminated by the present invention's utilization of a computer memory to store the digitized song data.

A further object of the present invention is to provide a method and apparatus capable of being used with the remote management of jukeboxes via public telephone lines without interfering with establishments' use of their own phone lines.

Other objects, features and advantages of the present invention will be readily apparent from the following description of certain preferred embodiments thereof taken in conjunction with the accompanying drawings, although variations and modifications may be effected without departing from the spirit and scope of the novel concepts of the disclosure.

BRIEF DESCRIPTION OF THE DRAWING

FIGS. 4A and B are flow-charts illustrating the software procedures used by the central management system and the jukebox respectively in managing the song library of the jukebox.

DESCRIPTION OF THE PREFERRED EMBODIMENTS

Figure 1:
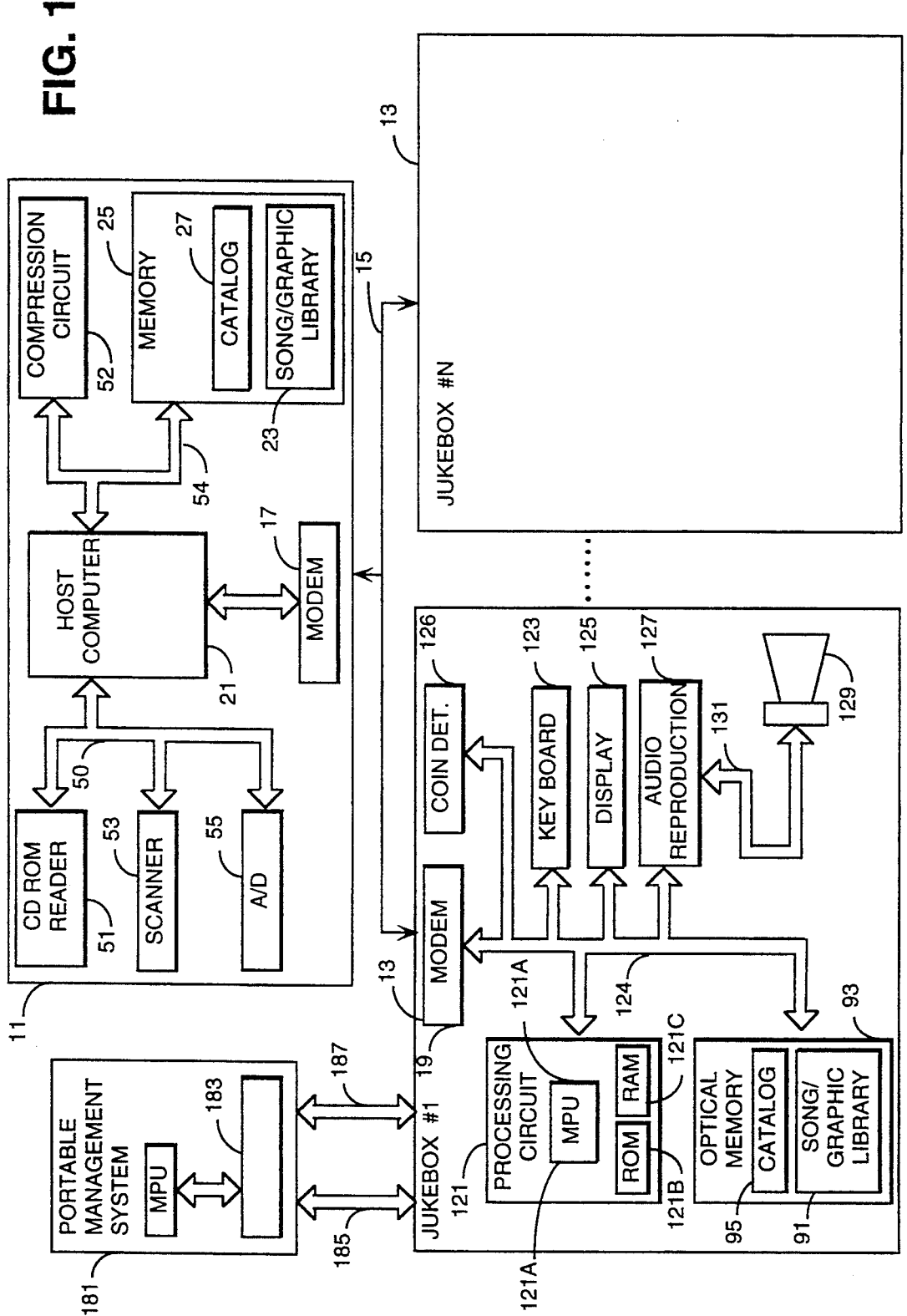
FIG. 1 is a block diagram of the computer jukebox system of the present invention.

In accordance with the present invention as shown in FIG. 1, a central management system 11 monitors and updates the available selection of music at a number of remotely located jukeboxes such as a jukebox 13. Particularly, the central management system 11 monitors each jukebox 13 to determine the number of times each song has been played. From these numbers, the central management system 11 can calculate the royalty payments that are due. More importantly, the central management system 11 can identify those specific songs which need to be replaced in each jukebox on an individual basis, the central management system communicating replacement songs to each jukebox 13 to update the available music selection therein as needed.

Each jukebox 13 is basically a computer having sophisticated audio production capability wherein each computer jukebox 13 is programmed to play songs that have been digitally compressed and stored in a large-volume data storage unit 93. The storage unit 93 may be a optical memory or any other available large volume nonvolatile computer memory that provides both read and write access.

The central management system 11 communicates with each computer jukebox 13 via a transmission link 15. The central management system 11 and each jukebox 13 use respective modems 17 and 19 to maintain serial communication on the transmission link 15. The transmission link 15 may be a cable system such as public or private telephone lines or the like. However, the modems 17 and 19 may be replaced with RF (radio frequency) transceivers and associated antennas. In the latter instance the transmission link 15 is an RF link.

Specifically, the central management system 11 includes a host computer 21 which maintains a master library 23 of songs and associated graphics which are stored in a compressed digital form in a bulk storage unit 25. The bulk storage unit 25 is capable of storing vast amounts of digital data, and may be take the form of a read-write optical storage device. The host computer 21 indexes the master library 23 by using a master catalog 27 which is also maintained in the bulk storage unit 25.

Figure 2:
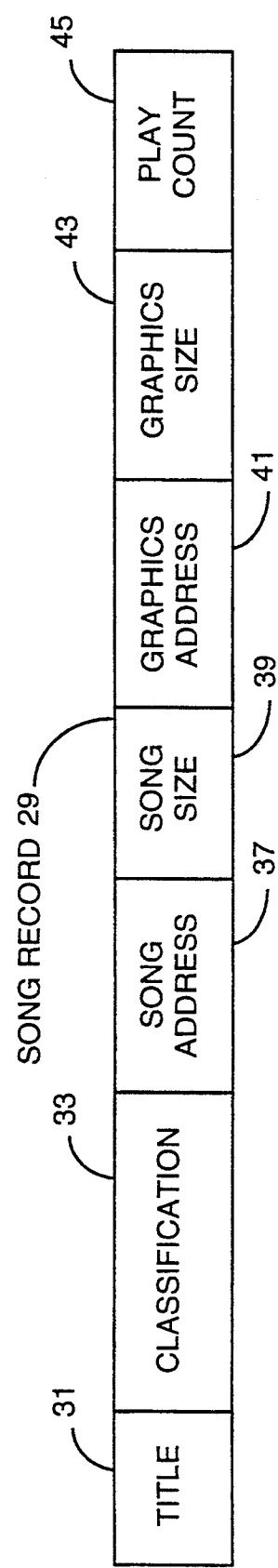
FIG. 2 is an illustration of the data structure of an individual song record stored in a master library catalog illustrated in FIG. 1.

The master catalog 27 stores a song record 29, as illustrated in FIG. 2, for each song stored in the master library 23. Each song record 29 associates information in the following fields: a) a title field 31, containing the name of the song; b) a classification field 33, containing the type of music, i.e., country, pop, jazz, classical, etc.; c) a song address field 37, containing the beginning address in the bulk storage unit 25 of the compressed digital data of the song; d) a song size field 39, containing the number of bytes in length of the compressed digital data; e) a graphics address field 41, containing the beginning address in the bulk storage unit 25 of the compressed digital data of a graphics image, if any, to be associated with the song; f) a graphics size field 43, containing the number of bytes in length of the compressed graphics image; and g) a play count field 45, containing a count which indicates the number of times this specific song has been played. By parsing the master catalog 27, the host computer 21 can quickly locate all available information relating to any available song. The master catalog 27 also stores data particular to each jukebox such as the number of times each available song has been played, the coin intake for that jukebox, etc. The data particular to each jukebox is uploaded from the jukebox to the central management system 11 to update the master catalog 27.

Returning to FIG. 1, in order to add to the master library 23 and associated master catalog 27, the host computer 21 receives, has compressed and stores in the bulk storage unit 25 digital data representing the new song and associated pictorial graphics. The host computer 21 receives the digital data for storage from three sources: 1) a compact disc read only memory (CDROM) reader 51, which reads CDROMs; 2) a graphics scanner 53, which digitizes pictorial graphic images; and 3) an analog to digital (A/D) reader/converter 55, which reads analog data from both tapes and records and then converts the analog data into digital data. A compression circuit 52 using an adaptive-delta, pulse-code-modulation compression scheme compresses the digital data before it is stored. Other compression schemes may also be used. The compression circuit 52 might also be fully replaced by a software algorithm which is executed by the host computer 21.

Figure 3:
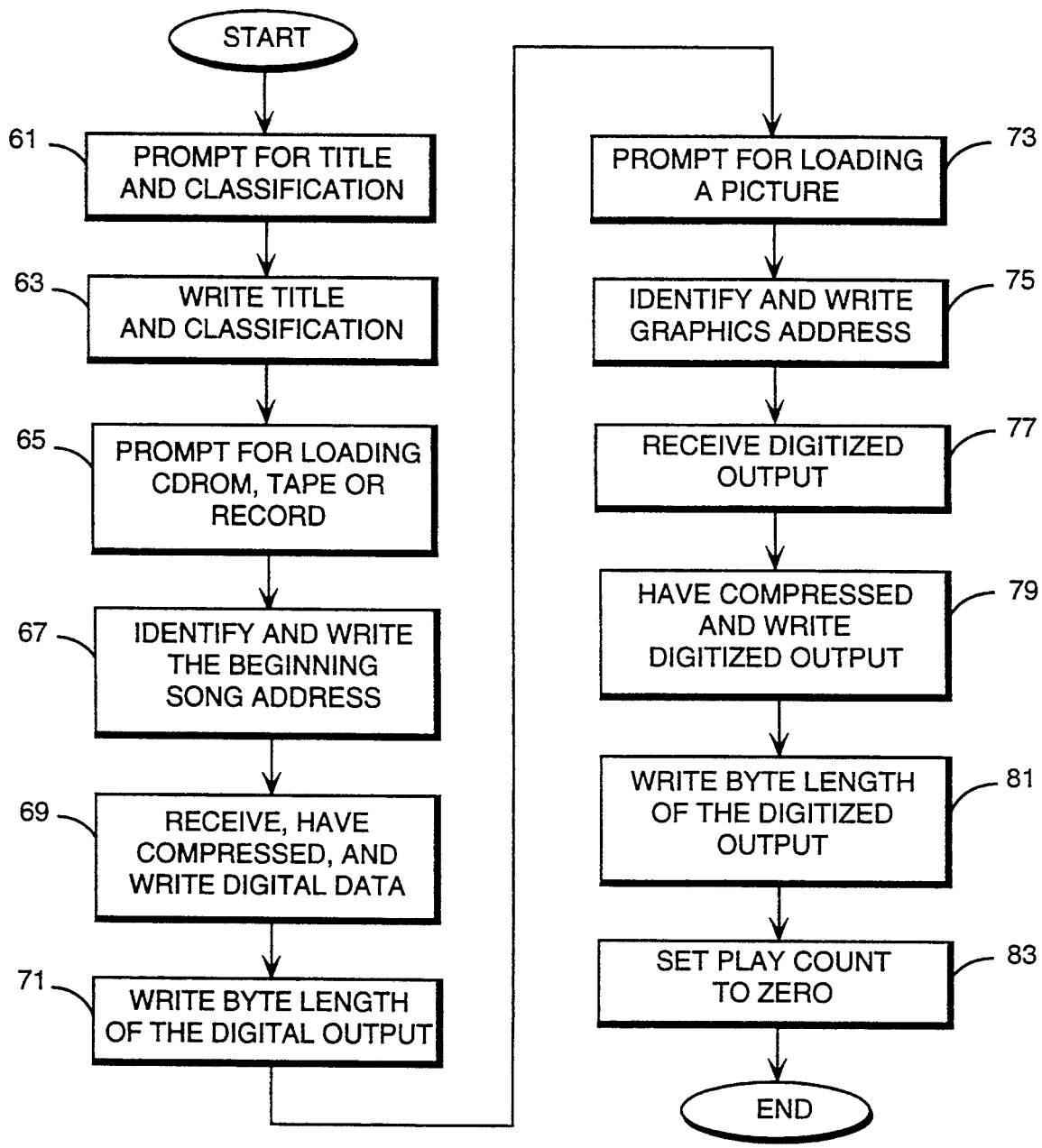
FIG. 3 is a flow-chart illustrating the procedure for storing new songs in a bulk storage unit illustrated in FIG. 1.

FIG. 3 more specifically illustrates the operation of the host computer 21 in adding new songs to the master library 23. At a block 61, the user is initially prompted by the host computer 21 to enter a new song title and category. The host computer 21 writes this information into the title field 31 and classification field 33 of a new song record 29 at a block 63. Next, at a block 65, the host computer 21 prompts the user to place either a CDROM into the reader 51 or a record or tape into the reader/converter 55. After the user has completed this placement, at a block 67 the host computer 21 identifies available storage space in the bulk storage unit 25 by analyzing the space in use as described in the current list of song records 29 in the master catalog 23. The beginning address of this available storage space is placed in the song address field 37 of the new song record 29. Thereafter, at a block 69, the host computer 21 provides a read enable signal on a bus 50 to either the reader 51 or reader/converter 55. Either the reader 51 or reader/converter 55 responds by reading and sending digital data representing the new song to the host computer 21 via the bus 50. Utilizing a bus 54, the host computer 21 forwards the digital data received to the compression circuit 52, receives compressed digital data from the compression circuit 52 and writes the compressed digital data into the bulk storage unit 25. At a block 71, upon reaching the end of the digital data output, i.e., the end of a song, the host computer 21 writes the byte length of the digital output into the song size field 39.

The host computer 21 at a block 73 prompts the user to load a picture, such as an album cover, into the graphics scanner 53. At a block 75, the host computer 21 identifies further available storage space in the bulk storage unit 25 and places the beginning address thereof into the graphics address field 41. Once a picture is loaded, the host computer 21 at block 77, using the bus 50, provides a read enable signal to the scanner 53 which responds via bus 50 by digitizing the picture and transferring the digitized output to the host computer 21. At a block 79, using the bus 54, the host computer 21 forwards the digitized data of the picture to the compression circuit 52, receives compressed digitized data from the compression circuit 52, and writes the compressed digitized data into the bulk storage unit 25. At a block 81, upon reaching the end of the digitized output, i.e., the end of the picture, the host computer 21 places the byte length of the digitized output into the graphics size field 43. Finally, at a block 83, the host computer 21 sets the play count field 45 to zero (0). This flow-chart is repeated as necessary until all of the new songs are added to the master library 27. It is noted that the operator can also delete, modify or replace any specific song record 29 found in the master catalog 23 and master library 27.

Returning to FIG. 1, each computer jukebox 13 plays songs and displays graphics which are stored locally in the large-volume data storage unit 93. The storage unit 93 of the jukebox 13 contains a subset of the songs found in the master library 27 maintained by the central management system 11. More specifically, the storage unit 93 of the jukebox 13 stores a song library 91 which is a corresponding subset of the master library 27. The song library 91 contains all of the currently available song selections and associated pictorial graphics for the jukebox 13. The storage unit 93 also stores a catalog 95 that is an index into the local song library 91. The catalog 95 is similar to the master catalog 23. Both the song library 91 and associated catalog 95 are monitored and updated by the central management system 11 as needed via the transmission link 15. The jukebox 13 permits this monitoring and updating at any time with no impact on its end-user performance.

The jukebox 13 also includes a processing circuit 121 which contains a microprocessor 121A, read only memory (ROM) 121B and random access memory (RAM) 121C. As in conventional computer systems, the microprocessor 121A operates in accordance with the software program contained in the ROM 121B and utilizes the RAM 121C for scratch-pad memory. The processing circuit 121 may also contain a decompression circuit (not shown) or may perform decompression using a software algorithm stored in the ROM 121B depending on the type of data compression scheme used by the central management system 11. In either case, decompression is necessary to decompress the compressed data received from the central control system 11 so that the song can be played and associated graphics image displayed.

The processing circuit 121 controls the operation and flow of data into and out of the jukebox 13 through the modem 19 via a bus 124. Using the bus 124, the processing circuit 121 also controls a visual display 125, one or more selection keys 123 and a coin/bill detector 126 to provide the user with an interactive interface to the jukebox 13. The keys 123 provide signals representing user inputs such as displayed song selection. The display 125 displays alpha numeric information as well as pictorial graphics to interface with the user. The coin/bill detector 126 is responsive to one or more coins or bills input by a customer to determine whether the proper amount of money has been input and to provide money detect signals coupled to the processing circuit. The processing circuit 121 further controls, via the bus 124, an audio reproduction circuit 127 coupled to a speaker system 129 along a bus 131 to provide an audio output to the user.

FIGS. 4A and 4B are flow-charts illustrating the software procedures respectively used by the central management system 11 and the jukebox 13 in managing the song library 91 of the jukebox 13. At a block 101, the central management system 11 initiates communication with one of the jukeboxes 13 via the transmission link 15. Immediately thereafter, at a block 103, the management system 11 requests that the jukebox data be sent including a copy of the catalog 95. At a corresponding block 141, the jukebox 13 responds by sending the copy of the catalog file as well as other jukebox data including total money intake over a period of time. The data sent from the jukebox to the management station may also include customer requests for new songs, a customer utilizing the display and keyboard of the jukebox 13 to enter song request data as discussed below. Thereafter, at a block 105, by examining each play count field 45 in the copy of the catalog 95 received, the management system 11 determines the royalty amount due per song and whether to replace or update specific song entries stored in the jukebox 13. The management system 11 also determines the total money intake from the play count information and compares this value to the total money intake value received from the jukebox to provide a check. At an inquiry block 107, if no replacements are necessary, the management system 11 branches to a block 109 to terminate communication with the jukebox 13. If, however, replacements are necessary, the management system 11 branches to download the changes. Particularly, at a block 111, the management system 11 downloads to the jukebox 13 the song records 29 of both the song to be replaced and the replacement song. In a corresponding block 143, the jukebox 13 replaces the song record 29 in the catalog 95. Thereafter, the jukebox 13 identifies available storage space in the storage unit 93 based on the song size field 39 of the new song, and writes the beginning address thereof into the song address field 37 in a corresponding block 145. Afterwards, at a block 113, the central management system 11 downloads the compressed digital data of the song to the jukebox 13. At a corresponding block 147, the jukebox 13 receives and writes the data into the song library 91. Next, at a corresponding block 149, the jukebox 13 identifies available storage space in the storage unit 93 based on the graphics size field 43, and writes the beginning address thereof into the graphics address field 41 of the new song. Thereafter, at a block 115, the management system 11 downloads the compressed digitized data of the picture to the jukebox 13. The jukebox, at a corresponding block 151, receives and writes the data into the song library 91. Finally, the block 107 is again encountered. If further replacements need to be made, the blocks 111, 113 and 115 are repeated until complete. At a corresponding block 153, the jukebox similarly repeats the corresponding blocks 143 through 151 until no further replacements need to be made. A further block placed immediately above the block 107 may also be used, wherein the central management system 11 sends a delete, modify, add or replace command to the jukebox 13 before downloading into the song library 93. In this way, the management system 11 receives additional flexibility in updating the jukebox 13. It is noted that the jukebox 13 can also initiate communications with the management system 11 at predetermined times or if the jukebox determines that an event has occurred that the management system 11 should be aware of.

Figure 5:
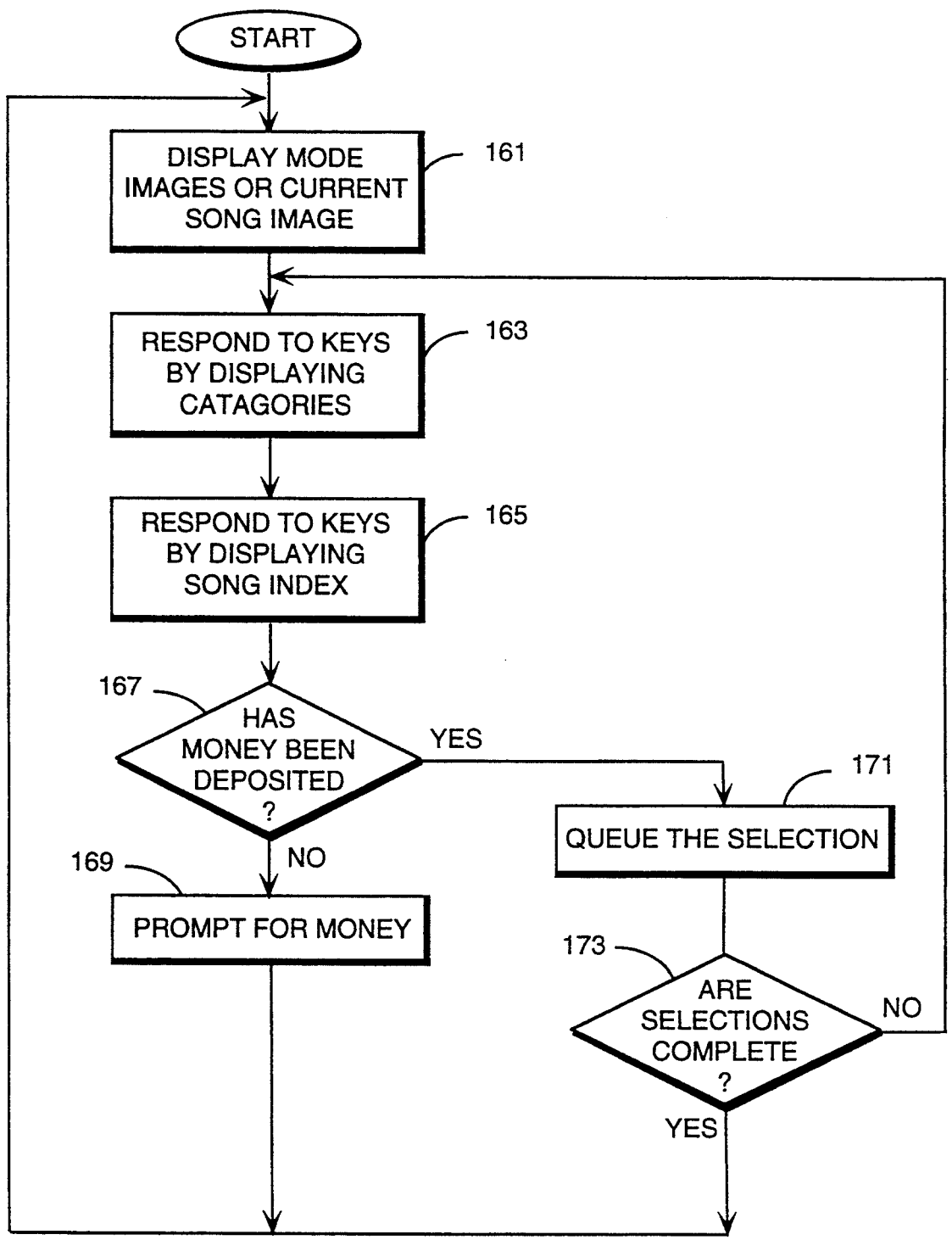
FIG. 5 is a flow-chart illustrating the specific operation of the jukebox in interfacing with a user.

FIG. 5 is a flow-chart illustrating the specific operation of the processing circuit 121 of the jukebox 13 in interfacing with the user. At a block 161, if no song selection is playing, the processing circuit 121 operates in a user attract mode, displaying a random sequence of available graphic images on the visual display 125. More particularly, the processing circuit 121 randomly selects a starting address of the compressed graphics data from the available song records 29 in the catalog 95. From that starting address, the circuit 121 retrieves the data from the song library 91 via the bus 124. The circuit 121 decompresses and transfers the data along the bus 124 to the visual display 125 for display. Thereafter, the circuit 121 again randomly selects a starting address of available graphics data and this cycle repeats. If, however, a song selection is being played when the block 161 is encountered, the attract mode sequencing does not occur. Instead, the circuit 121 displays the associated graphics image of the song being played on the display 125. During the attract mode the processing circuit 121 may also control the display 125 to present a prompt requesting customers to enter new song requests. The new song request data entered by a customer using the keyboard is stored and uploaded to the management system 11 to aid the system 11 in determining whether new song data should be downloaded to the jukebox.

At a block 163, the processing circuit 121 responds to a signal indicating user interest from the selection keys 123 by providing on the display 125 those music categories, i.e., country, rock, jazz, etc., found in the catalog 95. At a block 165, the circuit 121 responds to a signal indicating a category selection from the keys 123 by providing on the display 125 an index of available songs, arranged alphabetically either by artist or title, which can be scrolled and selected using the keys 123. Upon selection of a specific song, the circuit 121 encounters an inquiry block 167. If at the block 167 the circuit 121 determines from the signal received from the money detector 125 that a sufficient amount of money has not been deposited, a branch to a block 169 occurs. At the block 169, using the display 125, the circuit 121 prompts the user to deposit money into the coin/bill detector 126, then branches back to the block 161. However, if sufficient moneys have been deposited, the circuit 121 branches to a block 171 wherein the circuit 121 updates the play count field of the selected song's record in the catalog file 95 and money intake data stored in the memory. The circuit also places the song record 29 corresponding to the selected song into a queue of song records to be played. After the selection is queued, the circuit 121 encounters an inquiry block 153. If the total number of selections purchased have been selected, the circuit 121 branches back to the block 161. Otherwise, if further purchased selections are forthcoming, the circuit 121 branches back to the block 163. In this manner, all of the selections are made and placed in the queue. Upon completion of playing a queued-up, selected song, the circuit 121 removes the corresponding song record 29 from the queue, selects the next song record in the queue, begins to play that next song, and executes the block 161. It is noted that the song queue can be displayed on the display 125 in order to show customers what songs have already been selected prior to making their selection.

More specifically, referring back to FIG. 1, once a specific song has been selected and queued-up, the processing circuit 121 first identifies the beginning address of the compressed digital data from the song address field 37 of the song record 29 in the queue. From this address, using the bus 124, the circuit 121 reads the compressed digital data out of the storage unit 93, decompresses that data, and sends the decompressed digital data to the audio reproduction circuit 127. The audio reproduction circuit 127, commonly found in CDROM readers and associated amplifiers, converts the digital data to an analog signal which is amplified and used to drive the speaker system 129 via the bus 131. After a selected song finishes playing, the processing circuit 121 deletes the song record 29 of the selected song from the queue, increments the play count field 45 associated with that song in the catalog 95, and begins playing the next selected song in the queue if any exists. The process set forth in the flow-chart detailed in FIG. 5 is then repeated.

While the present invention is being described and illustrated in accordance with the preferred embodiment enabling new recordings and computer usage data to be transferred via the transmission line 15, the monitoring and updating may also be directly transferred. In this latter embodiment, routemen physically visit the location of each computer jukebox 13. During these visits, the routemen carry a portable management system 181 which has only a subset of potential replacement songs stored in a subset library and associated catalog (not shown) on a portable bulk storage unit 183. The subset library is loaded by the portable management system 181 onto the portable bulk storage unit 183 either directly from the bulk storage unit 25 or indirectly as is initially done by the central management system 11 (described above). In all other ways, the portable management system 181 operates the same as the central management system 11, collecting the catalog 95 of each jukebox 13 and updating or replacing as necessary. To accomplish this, the portable management system 181 communicates at a very high rate of speed with the jukebox 13 via a parallel communication link 185 and a direct memory access (DMA) link 187.

Additionally, the routemen may simply exchange the "old" storage unit 93 with a pre-loaded storage unit (not shown). The central management system 11 may later read the "old" storage unit 93 to gather the information from the catalog 95. Such an embodiment still enjoys the other advantages made possible by the computer jukeboxes 13 described herein.

Additionally, it is to be understood that the embodiments of the present invention described hereinabove are merely illustrative and that other modifications and adaptations may be made without departing from the scope of the appended claims.

We claim:

1. A computer jukebox capable of being updated upon the receipt of digital data representing a plurality of songs, data representing the identity of each of said songs and data representing the amount of storage space necessary to store said digital song data in said jukebox, comprising:

song selection means actuable by a user for generating a signal representing a song selected from a plurality of songs stored in said jukebox;

a programmable computer memory storing digital data representing each selectable song stored in said jukebox and a catalog file including data for each stored song representing the identity of said song and the location in said computer memory of the digital data representing said song;

a communication interface for receiving said digital song data, said song identity data and said storage space data;

audio speakers;

a digital to analog converter coupled between said song storing computer memory and said audio speakers to convert digital song data to an analog signal coupled to said speakers; and processing means responsive to a song selection signal for accessing said digital data representing a selected song from said computer memory to apply said song data to said digital to analog converter and said processing means being responsive to digital song data, song identity data and storage space data received by said communication interface to control the storage of said digital song data to update said jukebox.

2. A computer jukebox as recited in claim 1 wherein said song selection means includes means for displaying information identifying each song stored in said jukebox, said processing means being responsive to said catalog file data to control the information displayed on said display means to represent said updated jukebox song selections.

3. A computer jukebox as recited in claim 1 wherein said communication interface includes a modem.

4. A computer jukebox as recited in claim 1 wherein said communication interface includes a radio frequency receiver.

5. A computer jukebox as recited in claim 1 wherein said communication interface includes a direct communication interface port.

6. A computer jukebox as recited in claim 1 further including a money intake device, said device generating a money detection signal upon the receipt of money intake of a predetermined amount, said processing means being responsive to said money detector signal to update a money intake memory location in said computer memory, said location storing data representing the total intake of money for said jukebox over a period of time, said communication interface including means for transmitting said money intake data to a remote location under the control of said processing means.

7. A jukebox network comprising: a plurality of computer jukeboxes, each jukebox including a programmable computer memory storing digital data representing a plurality of selectable songs and data for each stored song representing the identity of said song and the location in said computer memory of the digital data representing said song;

a song selection device actuable by a user to select a song stored in said memory;

a communication interface for receiving and transmitting digital data including digital song data; and processing means responsive to a song select signal for controlling the accessing of song data stored in said memory to control the playing of a song and to store song usage data in said memory, said processing means being responsive to the receipt of digital song data by said communication interface to control the storage of said song data in said computer memory;

a management station for updating said plurality of jukeboxes, said management station including a communication interface for receiving and transmitting data and a host processing means for controlling the transmission of digital song data to a computer jukebox to update the jukebox, said management station being operative for selectively transmitting digital song data to different ones of said jukeboxes in response to song usage data received from a respective jukebox.

8. A jukebox network as recited in claim 7 wherein said management station is remote from said plurality of jukeboxes and the communication interface of said management station and each jukebox provides a two way communication link between said remote management station and said jukebox.

9. A jukebox network as recited in claim 7 wherein said management station is portable.

10. A jukebox network as recited in claim 9 wherein said communication interface of said management station and a jukebox provides a direct connection between said station and said jukebox.

11. A jukebox network as recited in claim 7 wherein said song usage data comprises a play count for each song on a jukebox, said play count corresponding to the number of a song has been played on respective jukebox.

12. A jukebox network as recited in claim 7 wherein said processing means processes said song usage data to determine which songs should be replaced on a respective jukebox.

* * * * *

UNITED STATES PATENT AND TRADEMARK OFFICE
CERTIFICATE OF CORRECTION

| | | |
|---|---|---|
| PATENT NO. | : 5,355,302 | |
| APPLICATION NO. | : 07/846707 | |
| DATED | : October 11, 1994 | |
| INVENTOR(S) | : Martin et al. | |

It is certified that error appears in the above-identified patent and that said Letters Patent is hereby corrected as shown below:

On the title page item [75], delete the third inventor Samuel N. Zammuto

Signed and Sealed this
Ninth Day of October, 2012

David J. Kappos
*Director of the United States Patent and Trademark Office*